United States Patent
Cai

(10) Patent No.: US 8,586,003 B2
(45) Date of Patent: Nov. 19, 2013

(54) METHOD AND APPARATUS FOR PRODUCTION OF HYDROGEN FROM METHANOL

(75) Inventor: Zhuoyan Cai, Græsted (DK)

(73) Assignee: Aquarden Technologies APS, Græsted (DK)

( * ) Notice: Subject to any disclaimer, the term of this patent is extended or adjusted under 35 U.S.C. 154(b) by 79 days.

(21) Appl. No.: 13/143,609

(22) PCT Filed: Jan. 5, 2010

(86) PCT No.: PCT/DK2010/050001
§ 371 (c)(1),
(2), (4) Date: Jul. 7, 2011

(87) PCT Pub. No.: WO2010/078871
PCT Pub. Date: Jul. 15, 2010

(65) Prior Publication Data
US 2012/0020873 A1 Jan. 26, 2012

(30) Foreign Application Priority Data
Jan. 7, 2009 (DK) .................................. 2009 00019

(51) Int. Cl.
*C01B 3/22* (2006.01)
*B01J 7/00* (2006.01)
*H01M 8/06* (2006.01)

(52) U.S. Cl.
USPC ............ 423/648.1; 48/61; 422/129; 422/620; 422/621; 422/622; 429/424

(58) Field of Classification Search
USPC ............... 423/648.1; 422/129, 620, 621, 622; 429/424; 48/61, 197 R
See application file for complete search history.

(56) References Cited

U.S. PATENT DOCUMENTS

| | | | |
|---|---|---|---|
| 2,632,316 A | 3/1953 | Du Bois Eastman | |
| 3,001,373 A | 9/1961 | Du Bois Eastman et al. | |
| 3,614,872 A | 10/1971 | Tassoney et al. | |
| 4,052,176 A | 10/1977 | Child et al. | |
| 4,670,187 A * | 6/1987 | Schurmans et al. | .......... 252/373 |

(Continued)

FOREIGN PATENT DOCUMENTS

| EP | 1 505 036 A2 | 2/2005 |
|---|---|---|
| GB | 680 159 A | 10/1952 |

(Continued)

*Primary Examiner* — Wayne Langel
(74) *Attorney, Agent, or Firm* — Nath, Goldberg & Meyer; Jerald L. Meyer; Sanjana Mangalagiri

(57) ABSTRACT

Method of producing hydrogen from methanol comprising providing a feed mixture of methanol and water at high pressure, delivering the feed mixture to a reactor chamber (5) equipped with an internal heat exchanger, wherein said feed mixture is heated by heat exchange with an outgoing reformed mixture from the reactor chamber, and wherein said outgoing reformed mixture is simultaneously cooled by said feed mixture. Raising the temperature in the upper part of the reactor chamber (5) for further heating and reforming said mixture, delivering the reformed mixture to a cooling system (6) for further cooling said reformed mixture below ambient temperature, delivering the cooled mixture to a hydrogen separator chamber (7) for separating hydrogen from said cooled mixture, delivering the remaining liquid mixture to a depressurisation chamber (8) for separating $CO_2$ from said remaining liquid mixture and recirculating the excess water from the depressurized mixture to the water tank (9) for supplying water for producing the said mixture of methanol and water.

8 Claims, 2 Drawing Sheets

(56) References Cited

U.S. PATENT DOCUMENTS

Figure 1:
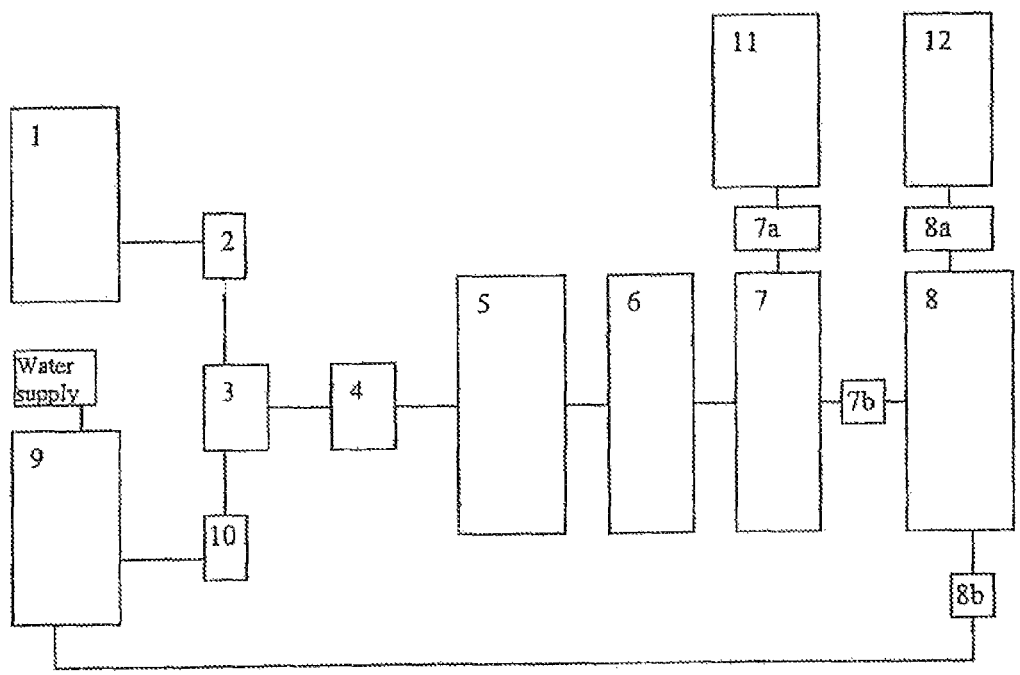

| | | | |
|---|---|---|---|
| 6,045,933 A * | 4/2000 | Okamoto | 429/413 |
| 6,497,972 B1 * | 12/2002 | Iwasaki | 429/424 |
| 6,926,979 B2 * | 8/2005 | Cao | 429/424 |
| 8,231,857 B2 * | 7/2012 | Cortright et al. | 423/648.1 |
| 2002/0068205 A1 * | 6/2002 | Griesmeier | 429/19 |
| 2002/0086192 A1 * | 7/2002 | Lightner | 429/17 |
| 2003/0041519 A1 * | 3/2003 | Maruko | 48/197 R |
| 2003/0077497 A1 * | 4/2003 | Cao | 429/26 |
| 2004/0172877 A1 | 9/2004 | Wunning | |
| 2006/0134470 A1 * | 6/2006 | Kaye et al. | 429/12 |
| 2007/0116995 A1 * | 5/2007 | Wilson | 429/20 |
| 2007/0292727 A1 * | 12/2007 | Duebel et al. | 429/17 |

FOREIGN PATENT DOCUMENTS

| | | |
|---|---|---|
| WO | 00/22690 A1 | 4/2000 |
| WO | 02/102708 A1 | 12/2002 |
| WO | 2009/065841 A1 | 5/2009 |

* cited by examiner

METHOD AND APPARATUS FOR PRODUCTION OF HYDROGEN FROM METHANOL

This is a National Phase Application filed under 35 U.S.C. 371 as a national stage of PCT/DK2010/050001, filed 5 Jan. 2010, and claiming the benefit from Danish Application No. PA 2009 00019, filed Jan. 7, 2009, the content of which is hereby incorporated by reference in its entirety.

TECHNICAL FIELD

The invention is related to a method for producing pressurized hydrogen ($H_2$) with a quality suitable for use in fuel cells—especially high-temperature proton exchange membrane (HTPEM) fuel cells—from methanol ($CH_3OH$) in a simple and economical way, and with a minimum consumption of water.

The process is especially suitable for the localized production of hydrogen for automobiles on the site of a fuelling station. Only methanol, a liquid at room temperature, needs to be transported to fuelling stations by means of conventional tank trucks and stored in conventional corrosion resistant tanks. This obviates the need to distribute huge quantities of hydrogen through high-pressure gas pipelines or cryogenic tank trucks from a central production facility. Large tanks for the long-term storage of hydrogen at fuelling stations can also be omitted. Due to the on-site production of hydrogen, the capacity of a hydrogen storage tank at a fuelling station can be as small as the daily sale of hydrogen.

DISCLOSURE OF THE INVENTION

Hydrogen production at the individual fuelling station has become possible with a method according to the invention.

The method according to the invention for producing hydrogen from methanol comprises:
providing a feed mixture of methanol and water,
delivering the feed mixture to a reactor chamber equipped with an internal heat exchanger, wherein said feed mixture is heated by heat exchange with an outgoing reformed mixture from the reactor, and wherein said outgoing reformed mixture is simultaneously cooled by said feed mixture,
raising the temperature in the upper part of the reactor chamber for further heating and reforming said feed mixture,
delivering the reformed mixture to a cooling system for further cooling said reformed mixture below ambient temperature,
delivering the cooled mixture to a high-pressure phase separation vessel for separating hydrogen from said cooled mixture,
delivering the remaining mixture to a low-pressure phase separation vessel for separating carbon dioxide ($CO_2$) from said remaining mixture, and
recirculating excess water from the depressurized mixture to a water tank for supplying water for producing the said feed mixture of methanol and water.

Embodiments of the method according to the invention are defined in claims 2 to 5.

The present invention further relates to a system for producing hydrogen from methanol comprising the features stated in claim 6. Embodiments of the system according to the invention are defined in claims 7 and 8.

BRIEF DESCRIPTION OF THE DRAWING(S)

Figure 2:
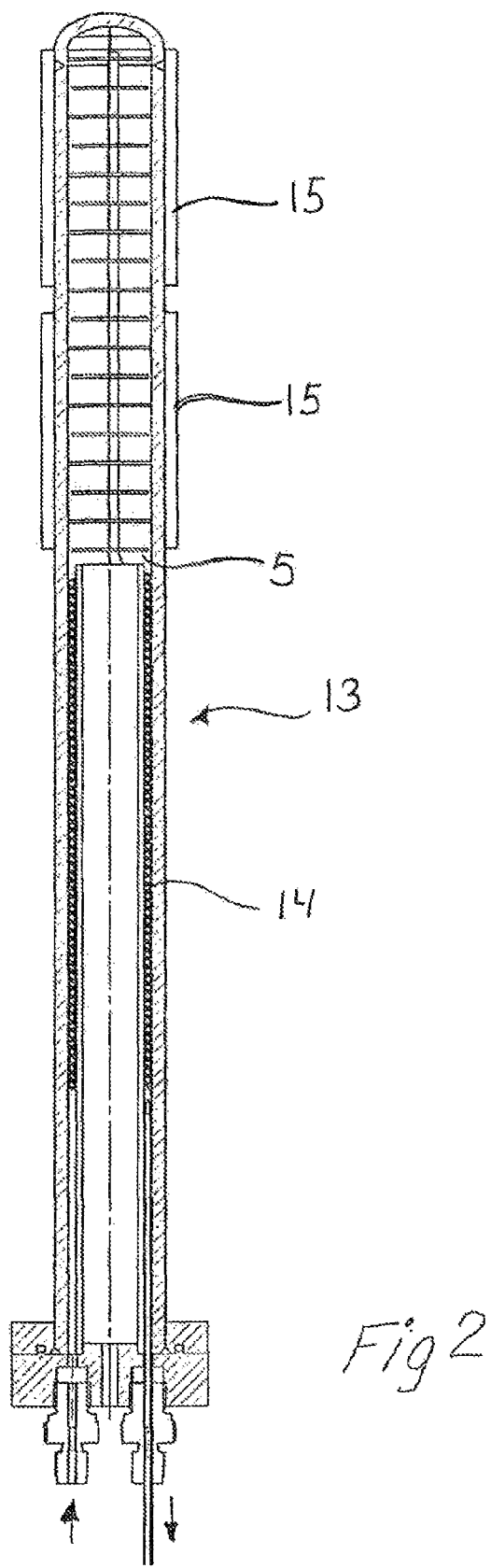

The invention is explained in detail below with reference to the drawing(s), in which FIG. 1 illustrates a system for producing hydrogen from methanol comprising a reactor, and FIG. 2 illustrates the reactor with an internal heat exchanger.

DETAILED DESCRIPTION OF THE INVENTION

A system for reforming methanol in supercritical water into hydrogen, particularly for hydrogen fuel cells, has previously been described in the paper Ind. Eng. Chem. Res. 2003, 42, 728-735 "Methanol Reforming in Supercritical Water" by N. Boukis, V. Diem, W Habicht, and E. Dinjus. Other gases produced during the reforming process include carbon monoxide (CO), methane ($CH_4$), and $CO_2$. The methanol reforming process is summarized by the following reactions:

| | | | |
|---|---|---|---|
| 1. | $CH_3OH$ | ↔ | $CO + 2H_2$ |
| 2. | $CO + H_2O$ | ↔ | $CO_2 + H_2$ |
| 3. | $CH_3OH + H_2O$ | ↔ | $CO_2 + 3H_2$ |
| 4. | $CO + 3H_2$ | ↔ | $CH_4 + H_2O$ |
| 5. | $CO_2 + 4H_2$ | ↔ | $CH_4 + 2H_2O$ |

The aforementioned paper investigates reactors made of Inconel alloy 625, where the metals of the inner surface of the reactor catalyse the reforming process. It has been reported that the catalytic effect can be activated by pretreating the inner surface of the reactor with an aqueous solution of hydrogen peroxide at supercritical conditions prior to running the reforming process (see also DE 101 35 431). The pretreatment solution significantly increases the concentration of nickel at the reactor surface by selectively dissolving other heavy metals and impurities from the reactor surface. This accelerates the conversion of methanol to hydrogen while suppressing the formation of CO.

CO poisons low temperature fuel cells at low concentrations of around 100 ppm. Conventional HTPEM fuel cells can tolerate higher concentrations of CO, but only between 1 to 5 vol. %. For these reasons, it is important to efficiently minimize CO production from the methanol reforming process.

It is further known from the aforementioned paper that reducing the concentration of methanol in the reforming process results in a reduced CO concentration and an increased concentration of hydrogen in the product gases. However, using low concentrations of methanol solution as feedstock is costly and unpractical, since much water needs to be constantly added to the system for diluting the methanol.

When a low concentration methanol solution (e.g. 5-10 wt. %) has undergone reforming, much water remains in excess since the reforming process consumes relatively small amounts of water. According to the invention all the excess water can be recycled for diluting more concentrated solutions of methanol feedstock so that only the amount of water consumed during the reforming process needs to be replaced.

A further aspect of the invention is to separate and contain the $CO_2$ produced from the methanol reforming process. It is known that $CO_2$, unlike hydrogen, is highly soluble in water and that gas solubility in water increases with the partial pressure of the gas. Due to the high pressure at which the reforming process takes place, much of the produced $CO_2$ dissolves readily in the excess water. If the $CO_2$-saturated excess water is directly recycled, then $CO_2$ can accumulate in the system and negatively affect the methanol reforming process, especially if the recycled water is kept pressurized. According to Le Chatelier's principle, an accumulation of dissolved $CO_2$ shifts the reaction equilibriums of reactions 2 and 3 in favour of lowering the hydrogen yield and increasing the formation of CO. Furthermore, $CO_2$ reacts with hydrogen to produce $CH_4$ and water (reaction 5), which further reduces the hydrogen yield. Thus, it is of interest to remove as much $CO_2$ as possible from the excess water prior to recycling. Captured $CO_2$ can be reused for other chemical processes.

An embodiment of a system for producing hydrogen from methanol is described below with reference to FIGS. 1 and 2.

The system comprises a methanol tank 1 connected to a mixture chamber 3 through a pump 2 and a water tank 9 connected to the mixture chamber 3 through a pump 10. The mixture chamber 3 is connected to a reactor chamber 5 of a reactor 13 through a high-pressure pump 4 for pumping feed mixture from the mixture chamber 3 to the reactor 13. The reactor 13 is preferably made from Inconel alloy 625 and provided with an internal heat exhanger 14 arranged in a lower portion of the reactor chamber 5. The heat exchanger 14 is composed of a heat conduction tube formed as a vertical helical coil. The cooler ingoing feed mixture flows upwards along the outer surface of the tube, while the warmer outgoing product mixture flows downwards inside the tube so as to provide heat exhange. The reactor 13 further comprises heating means such as electric resistors 15 attached to the outside of the reactor in an upper portion thereof comprising a reaction zone.

The reactor chamber 5 is connected to a cooling system 6 for cooling the reformed mixture leaving the reactor to a temperature below the ambient temperature.

The cooling system may for instance comprise a tank of refrigerated fluid, whereby the heat conducting tube delivering the product mixture is cooled by said refrigerated fluid.

The cooling system 6 is connected to a high-pressure phase separation vessel 7 for separating the produced hydrogen from the cooled mixture. The vessel 7 may be a vertical cylindrical vessel with outlets at the top and the bottom of the vessel. The top outlet of the vessel is connected to a high-pressure hydrogen tank 11 through a back-pressure regulator 7a. Via a second back-pressure regulator 7b the bottom outlet of the vessel 7 is connected to a low-pressure phase separation vessel 8 for separating $CO_2$ from the remaining mixture. The vessel 8 is similar in design to vessel 7 and equipped with a top gas outlet and a bottom liquid outlet. The top gas outlet of the vessel 8 is connected to a $CO_2$ tank 12 through a back-pressure regulator. The bottom liquid outlet of the vessel 8 is connected to the water tank 9 through a back-pressure regulator 8b.

Below an embodiment of the method of producing hydrogen from methanol is described by means of an example and with reference to FIGS. 1 and 2.

EXAMPLE

Water is added to dilute a methanol feedstock to 5-10 wt. % to provide a feed mixture. The feed mixture is then pumped into the reactor chamber 5 (FIG. 1) at a pressure of approximately 250 bar. The reactor chamber 5 is preferably constructed of Inconel alloy 625 and pretreated with a 3 wt. % aqueous solution of hydrogen peroxide for approximately 50 hours at a temperature of 600° C. and a pressure of 250 bar. The pressurized feed mixture enters the heat exchanger 14 located inside reactor chamber 5, whereby it is heated (FIG. 2). The heat exchanger 14 is composed of a heat-conducting tube formed as a vertical helical coil. The cooler ingoing feed mixture flows upwards along the outer surface of the tube, while the warmer outgoing product mixture flows downwards inside the tube so as to provide a heat exchange. The feed mixture enters the reactor chamber and heat exchanger at room temperature and exits the top of the heat exchanger with a temperature above 500° C. as a supercritical fluid, whereupon it enters a reaction zone to be further heated to 600° C. by electric resistors 15 attached to the outside of the reactor wall. At these conditions, methanol reacts completely with water to produce hydrogen, $CO_2$, and small quantities (less than 1%) of CO and $CH_4$. The product gases and excess water exit the reaction zone through an outlet located at the top of the reactor, and are directed to the internal heat exchanger to be cooled by the ingoing feed mixture.

The cooled product mixture exits the reactor chamber 5 (FIG. 1) with a temperature around 60° C. and a pressure of 250 bar, and is further cooled by the cooling system 6 (e.g. to 2° C.). The lower temperature allows more $CO_2$ in the product gas to dissolve in the excess water. The cooling system 6 may for instance comprise a tank of refrigerated fluid, whereby the heat conducting tube delivering the product mixture is cooled by said refrigerated fluid.

Thereafter the product mixture is delivered to the high-pressure phase separation vessel 7, for instance a vertical cylindrical vessel with outlets at the top and the bottom of the vessel. The hydrogen-rich product gas exits through the top outlet via back-pressure regulator 7a into pressure tank 11. Only an insignificant amount of $CO_2$ leaves the top outlet; most of the $CO_2$ remains saturated in the excess water due to the cold temperature and high pressure. The product gasses are already pressurized at a pressure of approximately 250 bar, which is favourable for direct high pressure storage in a hydrogen car. The hydrogen-rich gas can be directly used to power a HTPEM fuel cell. Theoretical calculations show that the product gasses may contain more than 90% hydrogen, and less than 1% CO and $CH_4$, with $CO_2$ as the balance. Post-processing of the gas can be performed to further lower the $CO_2$ level, or to remove any remaining CO for low temperature fuel cell applications.

$CO_2$-saturated water is directed through the bottom outlet of high-pressure phase separation vessel 7 via the second back-pressure regulator 7b to the low-pressure phase separation vessel 8 for depressurization. The low-pressure phase separation vessel 8 is similar in design to high-pressure phase separation vessel 7 and equipped with a top gas outlet and a bottom liquid outlet. During depressurization in the vessel 8, most of the dissolved $CO_2$ leaves the water through the top gas outlet and enters the tank 12 via back-pressure regulator 8a. Any remaining $CO_2$ in the water can be removed using standard techniques.

Automated ball valves at the outlets of the vessels 7 and 8 help to regulate a safe amount of liquid within the vessels so as to prevent gases from escaping through the bottom liquid outlet, or liquids from escaping through the top gas outlet. Only one outlet is open at a time for each vessel, whereby selection of the open outlet is determined for instance by the mass of the vessel. During regular operation, there is a continuous gas-liquid inflow into the vessels. If only the gas outlet is open, then the mass of the vessel rises since water, a far denser fluid than gas, accumulates within the vessel. Correspondingly, if only the liquid outlet is open, then the mass of the vessel falls in proportion to the decreasing volume of water in the vessel. If the mass of the vessel exceeds a first predetermined value, then only the liquid outlet is opened until the mass of the vessel falls below a second predetermined value, whereupon the liquid outlet closes and the gas outlet opens. The gas outlet remains open only until the mass of the vessel has risen to exceed the first predetermined value again, whereby the process repeats with the opening of the liquid outlet. This ensures that the water level in the vessel is maintained within an adequate distance from either outlet.

The excess water from low-pressure phase separation vessel 8 is released from the bottom liquid outlet via back-pressure regulator 8b, and is recycled back to the water delivery feed tank 9 to dilute the methanol feedstock.

LIST OF REFERENCE NUMERALS

1 Methanol tank
2 Pump
3 Mixture chamber
4 High-pressure pump
5 Reactor chamber
6 Cooling system
7 High-pressure phase separation vessel
7a Back-pressure regulator
7b Second back-pressure regulator
8 Low-pressure phase separation vessel
8a Back-pressure regulator
8b Back-pressure regulator
9 Water tank
10 Pump
11 Hydrogen tank
12 $CO_2$ tank
13 Reactor
14 Heat exchanger
15 Electric resistors

The invention claimed is:

1. Method of producing hydrogen from methanol in supercritical water comprising providing a feed mixture of methanol and water,
   delivering the feed mixture to a reactor chamber (5) equipped with an internal heat exchanger, wherein said feed mixture is heated by heat exchange with an outgoing reformed mixture from the reactor chamber, and wherein said outgoing reformed mixture is simultaneously cooled by said feed mixture,
   raising the temperature in the upper part of the reactor chamber (5) for further heating and reforming said mixture, delivering the reformed mixture to a cooling system (6) for further cooling said reformed mixture below ambient temperature,
   delivering the cooled mixture to a first phase separation vessel (7) for separating hydrogen from said cooled mixture,
   delivering the remaining liquid mixture to a second phase separation vessel (8) for separating $CO_2$ from said remaining liquid mixture, wherein the first phase separation vessel has a higher pressure than the second phase separation vessel, and recirculating the excess water from the depressurized mixture to a water tank (9) for supplying water for producing the said mixture of methanol and water.

2. Method according to claim 1, characterised by the mixture in the reactor chamber (5) being heated to a temperature between 550° C. and 650° C.

3. Method according to claim 1, characterised by pumps (2, 10) for delivering methanol and water for providing a mixture of methanol and water being adjusted so as to provide a methanol concentration in the range of 5 to 10 weight %.

4. Method according to claim 1, characterised by a back-pressure regulator (7a) inserted between the high-pressure phase separation vessel (7) and a hydrogen tank (11).

5. Method according to claim 1, characterised by a back-pressure regulator (8a) inserted between the low-pressure phase separation vessel (8) and a $CO_2$ tank (12).

6. System for producing hydrogen from methanol comprising
   a methanol tank (1) connected to a mixture chamber (3) through a pump (2), a water tank (9) connected to the mixture chamber (3) through a pump (10),
   said mixture chamber (3) being connected to a reactor chamber (5) with heating means and internal heat exchanging means, through a high-pressure pump (4),
   said reactor chamber (5) being connected to a cooling system (6) for cooling down the reformed mixture below ambient temperature,
   said cooling system (6) being connected to a high-pressure phase separation vessel (7) for separating the produced hydrogen from the cooled mixture,
   said high-pressure phase separation vessel (7) being connected to a low-pressure phase separation vessel (8) for separating the produced $CO_2$ from the remaining mixture, said low-pressure phase separation vessel (8) being connected to the water tank (9) for recirculation of water.

7. System according to claim 6, characterised by the high-pressure phase separation vessel (7) being connected to a high-pressure hydrogen tank (11) through a back-pressure regulator (7a).

8. System according to claim 6, characterised by the low-pressure phase separation vessel (8) being connected to a $CO_2$ tank (12) through a back-pressure regulator (8a).

* * * * *